(12) United States Patent
Liu et al.

(10) Patent No.: US 8,171,489 B2
(45) Date of Patent: *May 1, 2012

(54) TASK SWITCHING WITH STATE PRESERVATION FOR PROGRAMS RUNNING ON AN ELECTRONIC DEVICE

(75) Inventors: Chung Liu, Los Gatos, CA (US); Adam Tow, Mountain View, CA (US)

(73) Assignee: Access Co., Ltd., Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 12/413,564

(22) Filed: Mar. 29, 2009

(65) Prior Publication Data

US 2009/0187916 A1    Jul. 23, 2009

Related U.S. Application Data

(63) Continuation of application No. 09/827,888, filed on Apr. 6, 2001, now Pat. No. 7,512,952.

(51) Int. Cl.
*G06F 9/48* (2006.01)
(52) U.S. Cl. ........................ 718/108; 718/107
(58) Field of Classification Search .......... 718/107–108; 719/320
See application file for complete search history.

(56) References Cited

U.S. PATENT DOCUMENTS

| | | | |
|---|---|---|---|
| 4,713,656 A | 12/1987 | Cliff et al. | 345/168 |
| 5,530,865 A | 6/1996 | Owens et al. | 719/313 |
| 5,613,114 A | 3/1997 | Anderson et al. | 718/108 |
| 5,675,762 A | 10/1997 | Bodin et al. | 711/206 |
| 5,796,397 A | 8/1998 | Kusano | 715/804 |
| 5,900,875 A | 5/1999 | Haitani et al. | 345/840 |
| 6,047,122 A | 4/2000 | Spiller | 718/108 |
| 6,049,796 A | 4/2000 | Siitonen et al. | 707/3 |
| 6,061,711 A | 5/2000 | Song et al. | 718/108 |
| 6,526,431 B1 | 2/2003 | Bigbee et al. | 718/108 |
| 6,727,917 B1 | 4/2004 | Chew et al. | 715/765 |
| 6,757,365 B1 | 6/2004 | Bogard | 379/88.17 |

*Primary Examiner* — Qing Wu
(74) *Attorney, Agent, or Firm* — Berry & Associates P.C.

(57) ABSTRACT

A method and system providing switching between a plurality of installed programs in a computer system. Embodiments include a jump function comprising the steps: (1) determining a jump program that is to be the next program to be run, possibly from a plurality of possible choices; (2) creating input data for the jump program based on data in the current program; (3) storing the program state of the currently running program into a context packet and saving the context packet to memory; (4) releasing temporary memory that is used by the program, so as to allow other programs to use the memory; (5) calling the jump program with the created input data as input and terminating the currently running program.

12 Claims, 15 Drawing Sheets

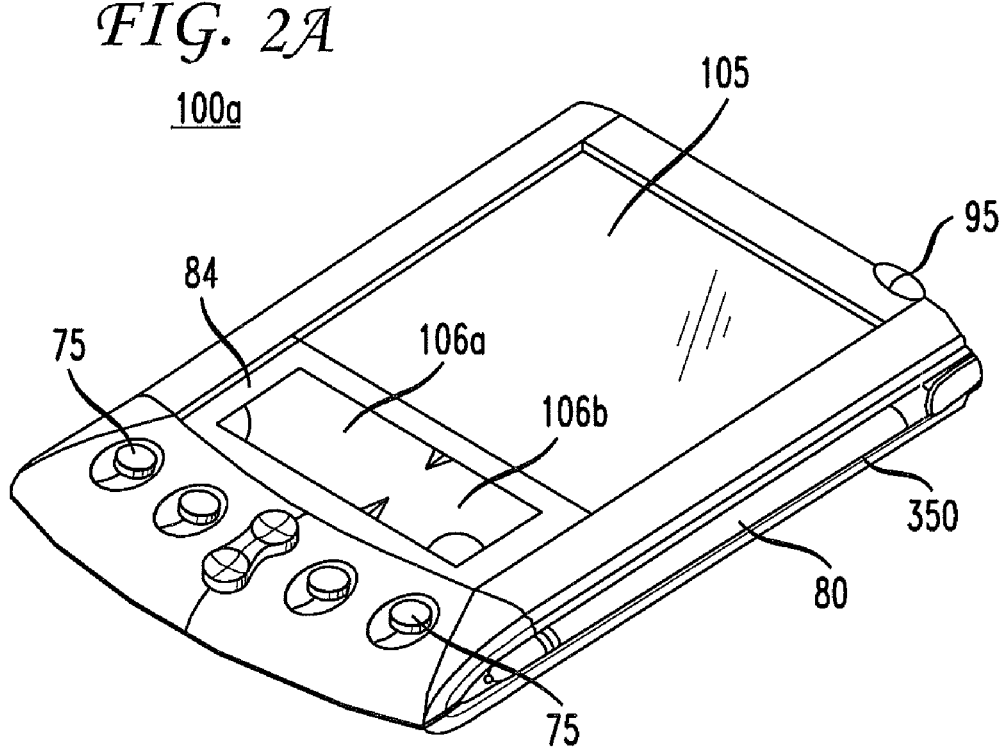
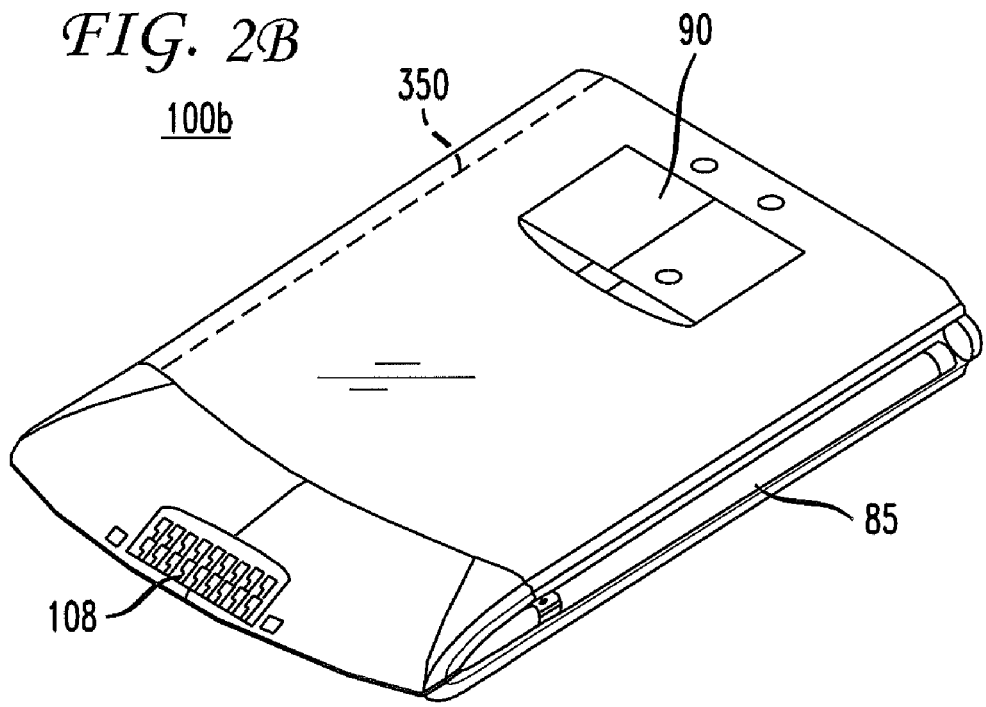

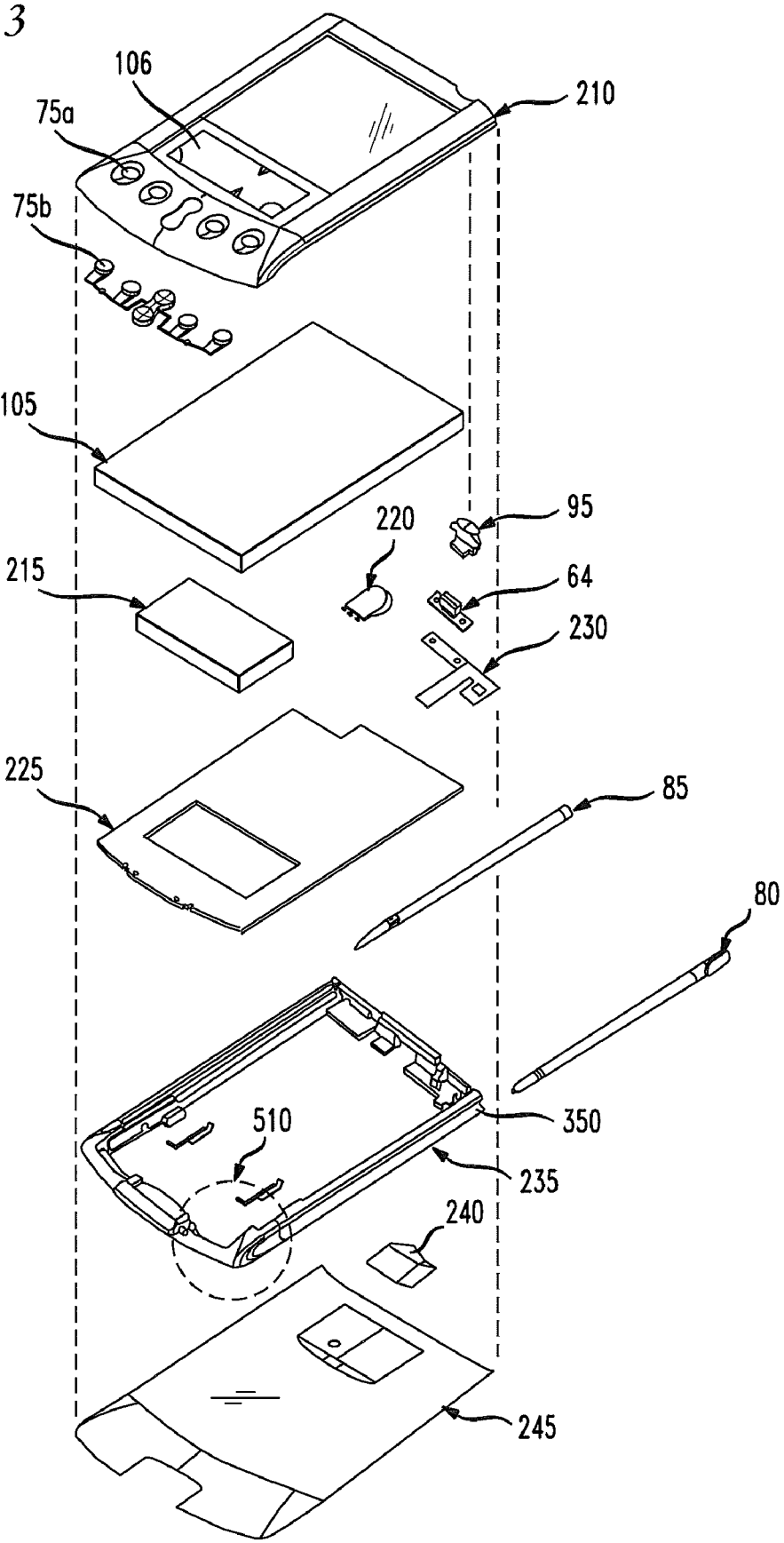

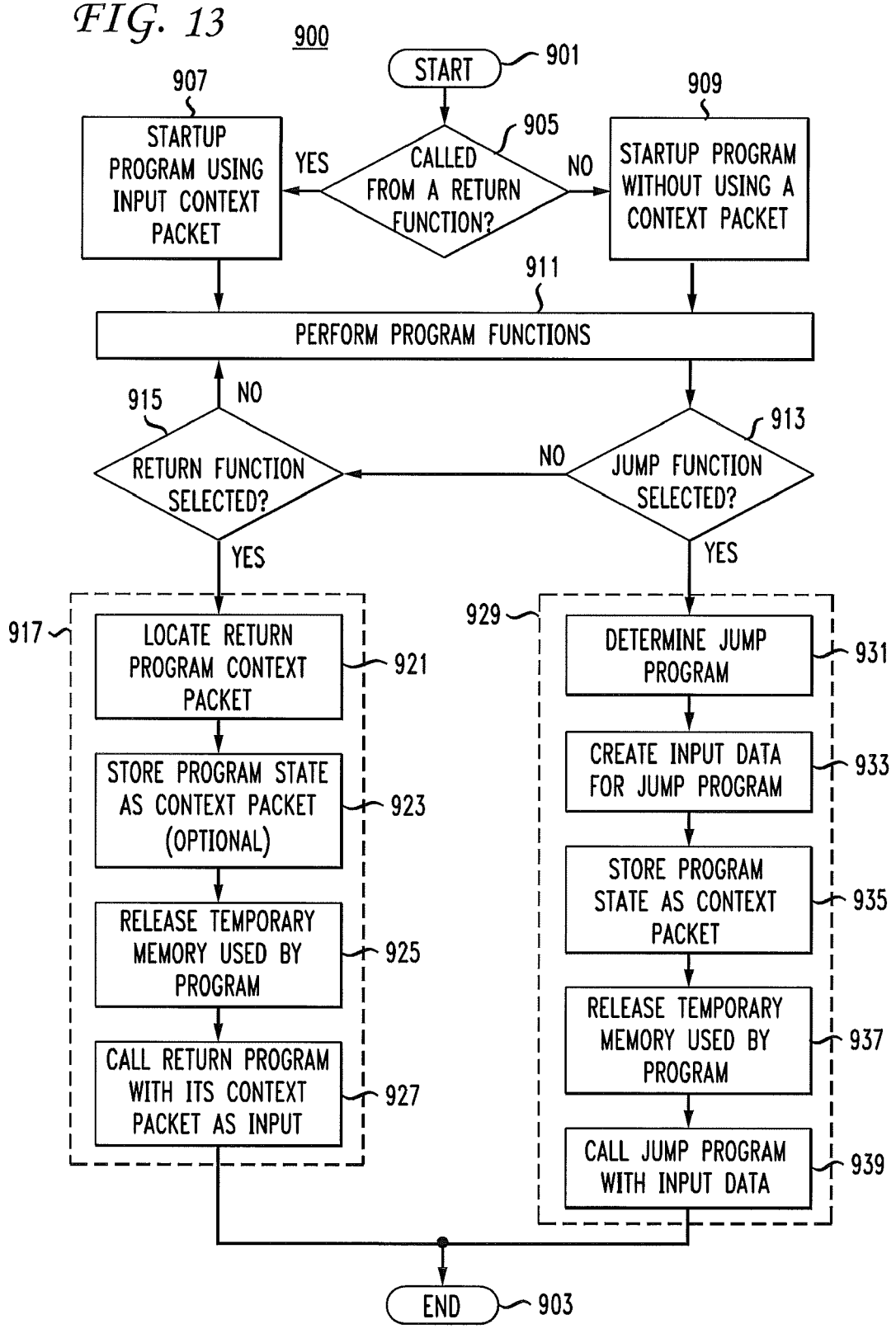

TASK SWITCHING WITH STATE PRESERVATION FOR PROGRAMS RUNNING ON AN ELECTRONIC DEVICE

CROSS REFERENCE TO RELATED APPLICATIONS

This application is a continuation application of application Ser. No. 09/827,888, now U.S. Pat. No. 7,512,952, entitled "TASK SWITCHING WITH STATE PRESERVATION FOR PROGRAMS RUNNING ON AN ELECTRONIC DEVICE," filed Apr. 6, 2001, and assigned to the assignee of the present application. The subject matter in the above-identified and commonly owned application(s) is incorporated herein by reference.

BACKGROUND OF THE INVENTION

1. Field of the Invention

The present invention relates to the field of data processing. More specifically, embodiments of the present invention relate to the preservation of program state for multiple programs running on an electronic device, e.g., a computer system, a portable computer system, a palmtop computer system, or any other hand-held electronic device that utilizes a display screen, such as a cell phone, a pager, etc.

2. Related Art

As the components required to build a computer system have reduced in size, new categories of electronic devices and computer systems have emerged. One of the new categories of computer systems is the "palmtop" computer system. A palmtop computer system is a computer that is small enough to be held in the hand of a user and can therefore be "palm-sized." Most palmtop computer systems are used to implement various Personal Information Management (PIM) applications such as an address book, a daily organizer (calendar, datebook, etc.) and electronic notepads, to name a few. Palmtop computers with PIM software have been known as Personal Digital Assistants (PDAs). Many PDAs have a small and flat display screen associated therewith.

In addition to PDAs, other portable electronic devices have display screens, such as cell phones, electronic pagers, remote control devices and other wireless portable devices. All of these devices have been adapted to display short lists of information on the display screens to help the user organize and display information, e.g., phone records.

User convenience is a very important factor for portable electronic devices. Typically, portable electronic devices are employed while the user is on the run, e.g., in business meetings, on business travel, personal travel, in a vehicle, on foot, etc. Because the user may be occupied or busy while using the portable electronic device, the number of user steps or user tasks required in order to access information from an electronic device (or to store information into the electronic device) is crucial for producing a commercially successful and useful product. That is, the more difficult it is to access data from an electronic device, the less likely the user will perform those tasks to obtain the information. Likewise, the easier information is to obtain, the more likely the portable electronic device will be used to obtain that information and the more likely the portable electronic device will become a part of the user's everyday activities.

One convenience factor for portable electronic devices relates to the ease of switching between application programs, hereinafter called task switching. For example, while using an email program, a user may receive an email message requesting him to confirm a proposed appointment, which requires the user to switch to a calendar program to check his availability. After checking his availability with the calendar program, the user needs to switch back to the email program to reply to the appointment-requesting email message.

Presently, users of palmtop computers perform a task switch by ending a first program (i.e., the first program terminates) and starting a second program. The problem with this mechanism is the inability to return to the first program at the point where the user left off. An alternate mechanism used on palmtop computers is to simply suspend operation of the first program, thereby providing a way to return to the point where the user left off. However, if the user swaps between many different programs, and each suspended program consumes more memory than when it is not running, then the palmtop computer's memory may be insufficient for all the programs. This is a particularly acute problem in palmtop computers because memory is a precious and limited resource.

A convenient feature for task switching currently incorporated into palmtop computers and telephones is the use of buttons. Buttons directly invoke a program, and can be either hardware pushbuttons on the device, areas on a touchscreen LCD with an icon, or a silk-screened area on a touchscreen. Hardware pushbuttons and silk screened area have the disadvantage of being limited in number, and generally correspond to a specific program included by the manufacturer at the factory. Hence, they are not expandable to include new programs. Also, examples currently in production cause the corresponding program to be started anew, thus losing the previous state the user had left for that program.

Presently, desktop and laptop computers perform a task switch by swapping between suspended programs or programs "in the background." For example, a user can have several programs running, each in a different window of the computer's user interface. The user simple swaps to a different window to task switch. This mechanism is enhanced with a multi-tasking operating system, as suspended programs still receive processors cycles (and are "in the background", rather than "suspended"). However, this mechanism is not well suited to palmtop or telephone applications due to the lack of a multitasking operating system, the lack of a windowed user interface, or a limited amount of memory.

In the early days of personal computers, there was a separate program, called a "switcher", that would allow the user to suspend the operation of one computer program and make another program the currently running program. This generally entailed the copying of a suspended program to a different part of memory, thereby having the shortcoming of both the copying operation and the consumption of memory by the suspended program.

Web browsers have a form of task switching that is convenient: their "back" and "forward" buttons. This, however, is done with a list of URLs (Uniform Resource Locators), rather than a set of memory resident programs. Also, the browser allows random hopping between a set of URLs via a bookmark mechanism.

SUMMARY OF THE INVENTION

Accordingly, embodiments of the present invention provide an electronic device having a mechanism for switching between programs that reduces memory usage by preserving the state of a program as a context packet and also increases user convenience for switching between programs. The present invention allows users to be using a first program, change to using a second program, and return to using the first program at the place where they had left off, even though the first program stops running and relinquishes memory that it has utilized. Returning to the first program is done by touching a single button, thereby providing significant ease of use. Furthermore, a user can jump between programs in a random fashion and have the option of (1) resuming a program at the place where he left off, or (2) restarting the program anew. The present invention provides these advantages and others not specifically mentioned above but described in the sections to follow.

As an example of task switching, while using an email program, a user may receive an email message requesting him to confirm a proposed appointment. The user switches to a calendar program to check his availability. After checking his availability with the calendar program, the user needs to switch back to the email program to reply to the appointment-requesting email message.

Presently, electronic devices handle task switching with one of two mechanisms. The first presently existing mechanism for task switching between a first program and a second program is done by: (1) ending the first program; (2) starting the second program; (3) processing user input with the second program; (4) ending the second program; and (5) restarting the first program. The first program has the capability to pass input parameters to the second program; for example, a phone number or a calendar date, thereby supplying a starting point for the second program. The primary shortcoming with this mechanism occurs when the first program is restarted, because, the first program starts anew. In the example above, where a user receives email and checks his calendar, the user would strongly prefer to be viewing the appointment-requesting email message when he returns to the email program, rather than the list of all incoming emails, as is done when the email program starts anew. It would be greatly preferable for the first program to resume at the place where it left off when the task switch started, but that is not possible with this prior art mechanism because the first program is ended and must be restarted. This mechanism is presently used, for example, in many palmtop computers.

The second presently existing mechanism for task switching between a first program and a second program is done by: (1) suspending the first program; (2) starting the second program, or returning to the second program if it is already running; (3) processing user input with the second program; (4) ending or suspending the second program; and (5) returning to the first program. However, this mechanism is not well suited to palmtop or telephone electronic devices due to the lack of a multitasking operating system, the lack of a windowed user interface, or a limited amount of memory.

Embodiments include the above and further include a return function comprising the steps: (1) locating a return program context packet corresponding to the return program that is to be the next program to be run; (2) storing the program state of the currently running program into a context packet and saving the context packet to memory; (3) releasing temporary memory that is used by the program, so as to allow other programs to use the memory; and (4) calling the return program with its context packet as input, thereby making the return program the next running program and terminating the currently running program.

Embodiments further include a jump function comprising the steps: (1) determining a jump program that is to be the next program to be run, possibly from a plurality of possible choices; (2) creating input data for the jump program based on data in the current program; (3) storing the program state of the currently running program into a context packet and saving the context packet to memory; (4) releasing temporary memory that is used by the program, so as to allow other programs to use the memory; (5) calling the jump program with the created input data as input and terminating the currently running program.

BRIEF DESCRIPTION OF THE DRAWINGS

FIG. 2A is a top side perspective view of a palmtop computer system that can be used in one embodiment of the present invention.

FIG. 2B is a bottom side perspective view of the palmtop computer system of FIG. 2A.

FIG. 3 is an exploded view of the components of an exemplary palmtop computer system of FIG. 2A.

FIG. 13 is a flow diagram of a computer process in accordance with an embodiment of the present invention for the use of a context packet by a program.

DETAILED DESCRIPTION OF THE INVENTION

Figure 1:
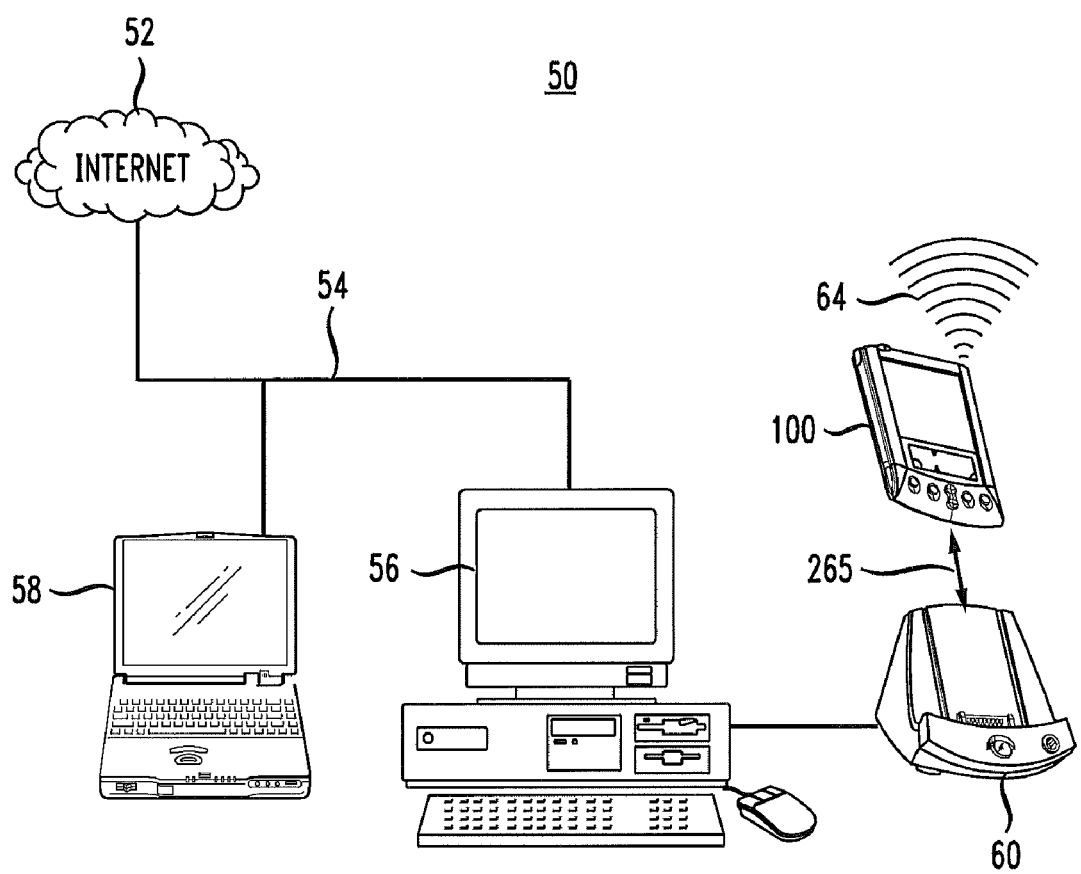
FIG. 1 is system illustration of a palmtop or "palm sized" computer system connected to other computer systems and the Internet via a cradle device.

In the following detailed description of the present invention, task switching with state preservation far programs running on an electronic device, numerous specific details are set forth in order to provide a thorough understanding of the present invention. However, it will be recognized by one skilled in the art that the present invention may be practiced without these specific details or with equivalents thereof. In other instances, well known methods, procedures, components, and circuits have not been described in detail as not to unnecessarily obscure aspects of the present invention.

Notation and Nomenclature

Some portions of the detailed descriptions which follow (e.g., process 320 and process 420) are presented in terms of procedures, steps, logic blocks, processing, and other symbolic representations of operations on data bits that can be performed on computer memory. These descriptions and representations are the means used by those skilled in the data processing arts to most effectively convey the substance of their work to others skilled in the art. A procedure, computer executed step, logic block, process, etc., is here, and generally, conceived to be a self-consistent sequence of steps or instructions leading to a desired result. The steps are those requiring physical manipulations of physical quantities. Usually, though not necessarily, these quantities take the form of electrical or magnetic signals capable of being stored, transferred, combined, compared, and otherwise manipulated in a computer system. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussions, it is appreciated that throughout the present invention, discussions utilizing terms such as "checking," "accessing" or "processing" or "computing" or "suspending" or "resuming" or "translating" or "calculating" or "determining" or "scrolling" or "displaying" or "recognizing" or "executing" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Exemplary Palmtop Computer System Platform

The processes of the present invention described herein are particularly applicable to portable electronic devices that have display screens and that execute a variety of programs. These devices include, for instance, cell phones, pagers and portable computer systems. Although applicable across a wide variety of platforms and devices, the present invention is described herein by example with respect to a portable computer system.

FIG. 1 illustrates an exemplary networked system 50 that can be used in conjunction with an embodiment of the present invention. System 50 is exemplary only and comprises a host computer system 56 which can either be a desktop unit as shown, or, alternatively, can be a laptop system 58. Optionally, one or more host computer systems can be used within system 50. Host computer systems 58 and 56 are shown connected to one or more communication buses 54, which in one embodiment can include a serial communication bus, but could be of any of a number of well known designs, e.g., a parallel bus, Ethernet Local Area Network (LAN), etc.

Optionally, bus 54 (or a separate communication channel) can provide communication with the Internet 52 using a number of well known protocols.

Importantly, a bus 54 is also coupled to a cradle 60 (or cable dock) for receiving and initiating communication with an exemplary palmtop ("palm-sized) portable computer system 100. Cradle 60 provides an electrical and mechanical communication interface between bus 54 (and anything coupled to bus 54) and the computer system 100 for two way communications. Computer system 100 may also contain a wireless infrared communication mechanism 64 for sending and receiving information to or from other devices.

FIG. 2A is a perspective illustration of the top face 100a of one embodiment of the palmtop computer system. The top face 110a contains a display screen 105 surrounded by a bezel or cover. A removable stylus 80 is also shown. The display screen 105 contains a transparent touch screen (digitizer) able to register contact between the screen and the tip of the stylus 80. The stylus 80 can be of any material to make contact with the screen 105. As shown in FIG. 2A, the stylus 80 is inserted into a receiving slot or rail 350. Slat or rail 350 acts to hold the stylus when the computer system 100a is not in use. Slot or rail 350 may contain switching devices for automatically powering down and automatically power up computer system 100a based on the position of the stylus 80. The top face 100a also contains one or more dedicated and/or programmable buttons 75 for selecting information and causing the computer system to implement functions. Other buttons (icons) can be implemented within a silk screen layer material 84 on which regions 106a and 106b reside. The on/off button 95 is also shown.

FIG. 2A also illustrates a handwriting recognition pad or "digitizer" containing two regions 106a and 106b. Region 106a is for the drawing of alpha characters therein for automatic recognition (and generally not used for recognizing numeric characters) and region 106b is for the drawing of numeric characters therein for automatic recognition (and generally not used for recognizing numeric characters). The stylus 80 is used for stroking a character within one of the regions 106a and 106b. The stroke information is then fed to an internal processor for automatic character recognition. Once characters are recognized, they are typically displayed on the screen 105 for verification and/or modification.

Figure 5:
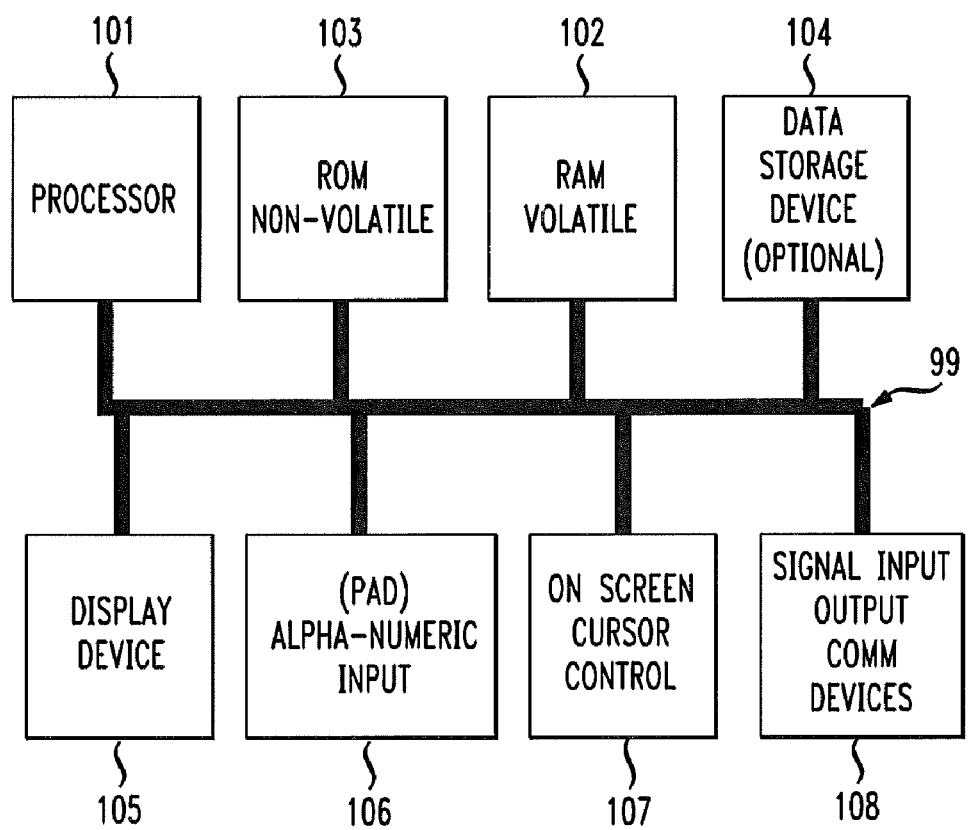
FIG. 5 is a logical block diagram of an exemplary palmtop computer system in accordance with an embodiment of the present invention.

The digitizer 106 records both the (x, y) coordinate value of the current location of the stylus and also simultaneously records the pressure that the stylus exerts on the face of the digitizer pad. The coordinate values (spatial information) and pressure data are then output on separate channels for sampling by the processor 101 (FIG. 5). In one implementation, there are roughly 256 different discrete levels of pressure that can be detected by the digitizer 106. Since the digitizer's channels are sampled serially by the processor, the stroke spatial data are sampled "pseudo" simultaneously with the associated pressure data. The sampled data is then stored in a memory by the processor 101 (FIG. 5) for later analysis.

FIG. 2B illustrates the bottom side 100b of one embodiment of the palmtop computer system. An optional extendible antenna 85 is shown and also a battery storage compartment door 90 is shown. A communication interface 108 is also shown. In one embodiment of the present invention, the serial communication interface 108 is a serial communication port, but could also alternatively be of any of a number of well known communication standards and protocols, e.g., parallel, SCSI, Firewire (IEEE 1394), Ethernet, etc. In FIG. 2B is also shown the stylus receiving slot or rail 350.

Figure 2C:
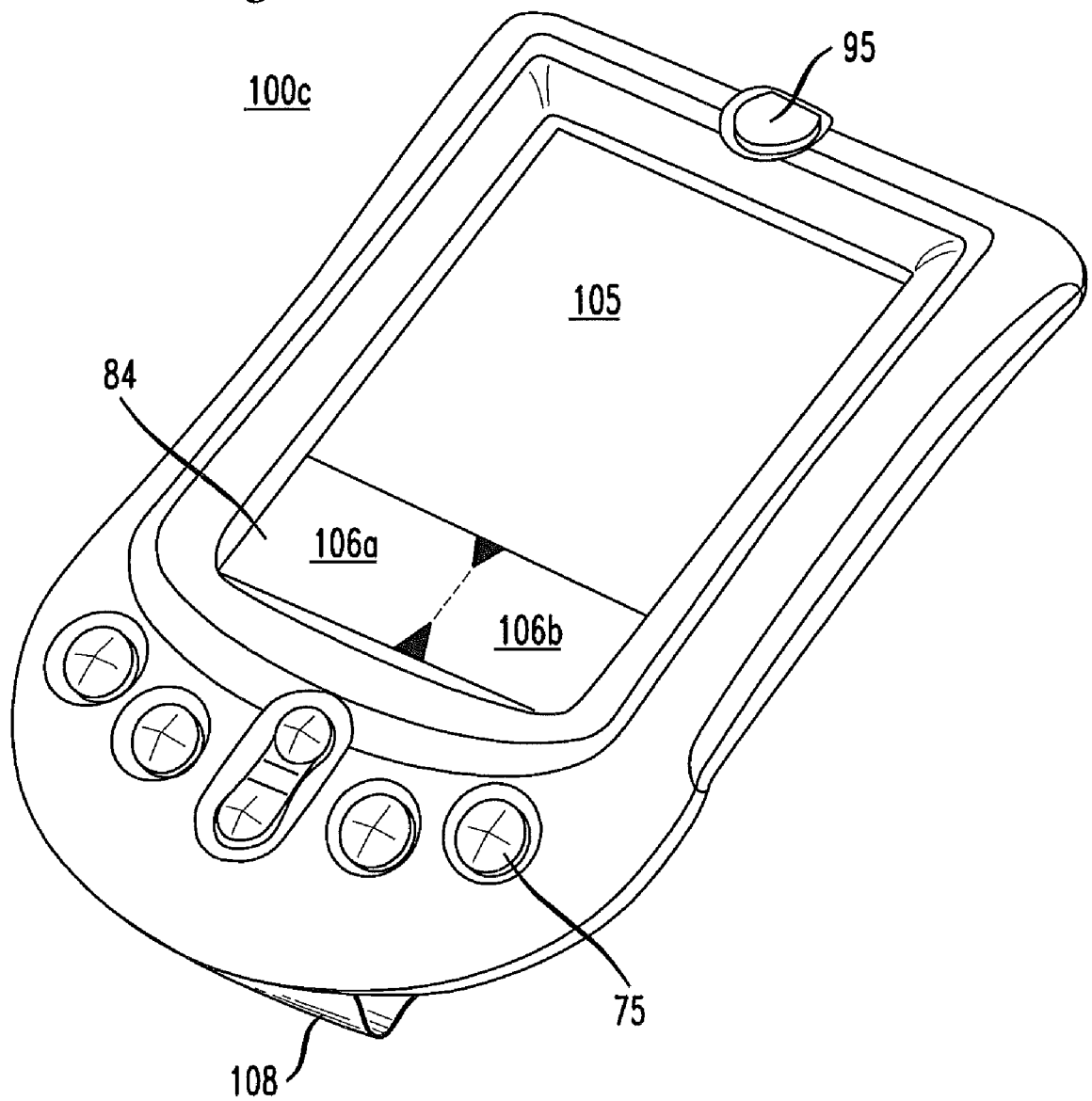
FIG. 2C is a perspective top view of another exemplary embodiment of a palmtop computer system.

FIG. 2C illustrates a front perspective view of another implementation 100c of the palmtop computer system. As shown, the flat central area is composed of a display screen area 105 and a thin silk screen layer material portion 84. Typically, the silk screen layer material portion 84 is opaque and may contain icons, buttons, images, etc., graphically printed thereon in addition to regions 106a and 106b. The display screen area 105 and portion 84 are disposed over a digitizer.

FIG. 3 is an exploded view of the exemplary palmtop computer system 100. System 100 contains a front cover 210 having an outline of region 106 and holes 75a for receiving buttons 75b. A flat panel display 105 (both liquid crystal display and touch screen) fits into front cover 210. Any of a number of display technologies can be used, e.g., LCD, FED, plasma, etc., for the flat panel display 105. In one embodiment, the display 105 is a flat panel multi-mode display capable of both monochrome and color display modes.

The touch screen can be a digitizer. A battery 215 provides electrical power. Replaceable cells or rechargeable batteries can be used. Well known electronics coupled to the battery 215 can detect the energy level of the battery 215. This information can be sampled by the computer system 110 (FIG. 5) using well known techniques. The digitizer of FIG. 3 can be implemented using well known devices, for instance, using the ADS-7846 device by Burr-Brown that provides separate channels for spatial stroke information and pressure information. A contrast adjustment (potentiometer) 220 is also shown but can also be implemented electronically, e.g., by software, (FIG. 2C) without any manual knob. On/off button 95 is shown along with an infrared emitter and detector device 64. A flex circuit 230 is shown along with a PC board 225 containing electronics and logic (e.g., memory, communication bus, processor, etc.) for implementing computer system functionality. The digitizer pad is also included in PC board 225. A midframe 235 is shown along with stylus 80. Optional position adjustable antenna 85 is shown. The midframe 235 contains the stylus receiving slot or rail 350.

An optional radio receiver/transmitter device 240 is also shown between the midframe and the rear cover 245 of FIG. 3. The receiver/transmitter device 240 is coupled to the antenna 85 and also coupled to communicate with the PC board 225. In one implementation, the Mobitex wireless communication system is used to provide two way communication between system 100 and other networked computers and/or the Internet via a proxy server. In other embodiments, TCP protocol can be used.

Figure 4:
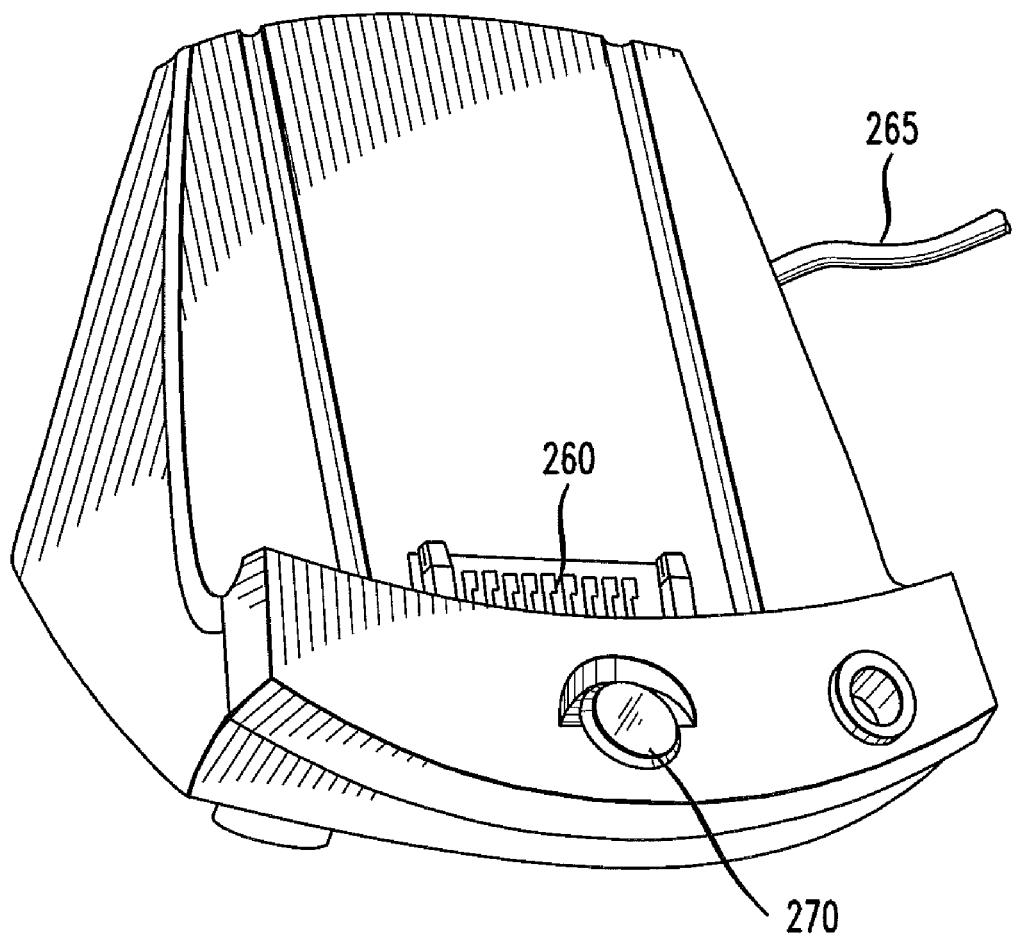
FIG. 4 is a perspective view of a cradle device for connecting a palmtop computer system to other systems via a communication interface.

FIG. 4 is a perspective illustration of one embodiment of the cradle 60 for receiving the palmtop computer system 100. In other embodiments, cradle 60 is not a stand-up device but is rather part of a cable connection between the palmtop computer system 100 and the desk top unit. Cradle 60 contains a mechanical and electrical interface 260 for interfacing with serial connection 108 (FIG. 28) of computer system 100 when system 100 is slid into the cradle 60 in an upright position. Once inserted, button 270 can be pressed to initiate two way communication between system 100 and other computer systems coupled to serial communication 265.

FIG. 5 illustrates circuitry of palmtop computer system 100, some of which can be implemented on PC board 225. Computer system 100 includes an address/data bus 99 for communicating information, a central processor 101 coupled with the bus 99 for processing information and instructions, a volatile memory 102 (e.g., random access memory RAM) coupled with the bus 99 for storing information and instructions for the central processor 101 and a non-volatile memory 103 (e.g., read only memory ROM) coupled with the bus 99 for storing static information and instructions for the processor 101. Computer system 110 also includes an optional data storage device 104 (e.g., thin profile removable memory) coupled with the bus 99 for storing information and instructions. Device 104 can be removable. As described above, system 100 also contains a display device 105 coupled to the bus 99 for displaying information to the computer user. PC board 225 can contain the processor 101, the bus 99, the ROM 103 and the RAM 102.

Also included in computer system 100 of FIG. 5 is an alphanumeric input device 106 which in one implementation is a handwriting recognition pad ("digitizer") having regions 106a and 106b (FIG. 2A), for instance. Device 106 can communicate information (spatial data and pressure data) and command selections to the central processor 101. System 100 also includes an optional cursor control or directing device 107 coupled to the bus for communicating user input information and command selections to the central processor 101. In one implementation, device 107 is a touch screen device incorporated with screen 105. Device 107 is capable of registering a position on the screen 105 where the stylus makes contact and the pressure of the contact. The display device 105 utilized with the computer system 100 may be a liquid crystal device, cathode ray tube (CRT), field emission device (FED, also called flat panel CRT) or other display device suitable for creating graphic images and alphanumeric characters recognizable to the user. In one embodiment, the display 105 utilizes color sequential scanning but could also utilize color filters with subpixels.

Signal communication device 108, also coupled to bus 99, can be a serial port for communicating with the cradle 60. Device 108 can also include an infrared communication port.

Figure 6:
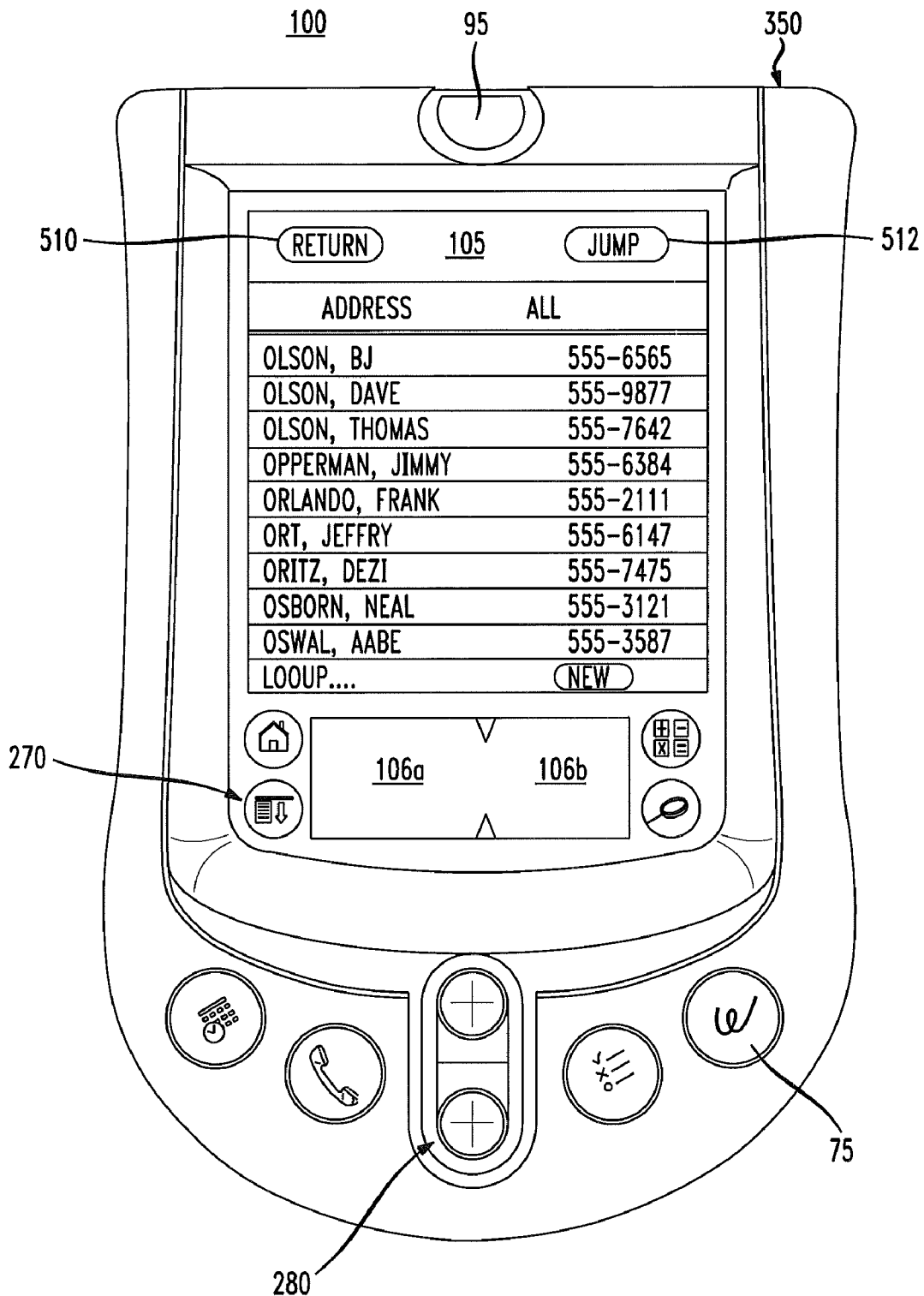
FIG. 6 is a front view of an exemplary palmtop computer system running an exemplary phone book application, and having a return button and a jump button in accordance with an embodiment of the present invention.

FIG. 6 illustrates device 100 which contains several icons 270 printed on the silk screen layer. These icons, e.g., a home icon, a menu icon, a calculator icon and a finder icon, are user selectors and when tapped with the stylus these icons cause certain applications to be executed or invoke menu options within applications that are currently being displayed. Also shown is a scroll selector 280. Scroll selector 280 has an up button and a down button to cause list scrolling on the display 105.

Also shown are two regions of digitizer 106a and 106b. Region 106a is for receiving user stroke data (and pressure data) for alphabet characters, and typically not numeric characters, and region 106b is for receiving user stroke data (and pressure data) for numeric data, and typically not for alphabetic characters. Physical buttons 75 are also shown. Although different regions are shown for alphabetic and numeric characters, the device is also operable within a single region that recognizes both alphabetic and numeric characters. it is appreciated that, in one embodiment, the digitizer region 106a and 106b are separate from the display screen 105 and therefore does not consume any display area. Also shown in FIG. 6 is the position of the stylus receiving slot or rail 350. It is appreciated that while the stylus receiving slot or rail 350 is depicted on the right of the computer 100, it can also be deployed on the left or along the top edge or along the bottom edge.

Task Switching with State Preservation in Accordance with Present Invention

FIG. 6 is a front view of an exemplary palmtop computer system 100 with an exemplary display of an address book within its screen 105. It is appreciated that the present invention can be applied to any program, and the address book program is only one example. The address book program includes the innovative features of a return button 510 and a jump button 512. If the user selects the return button 510, a task switch takes the user back to the previous program he was using, resuming that program where he had left off, the state of the previous program being read from a context packet 520. If the user selects the jump button 512, the present state of the current program is saved as a context packet 520, and a task switch transfers control to a different program. The current program can pass information to the jump program, such as a phone number, a calendar date, or an email address, and such information would be selected by the user before the jump button 512 is selected. If a particular program is designed, or assigned, to task switch to a selectable one of several programs, then multiple jump buttons 512 can be used, but more advantageously, a pull-down menu can appear to allow the user to select between multiple jump programs. Programs can be designed to work together and are, therefore, possible jump programs for each other. In addition, the user can designate which programs are possible jump programs. One objective of this invention is to provide easy task switching to related jump programs. Therefore, a pull-down menu for task switching would not list all the programs installed on the electronic device, but, rather, only those programs which would be useful as next programs to run.

The return button 510 and jump button 512 are examples of an embodiment of the invention, and these functions can be implicitly selected by other user actions. As an example of in implicit jump function, an email program could task switch to a telephone program when the user highlights a phone number, then double-taps on the phone number. Similarly, an implicit return function can be executed when a user completes an operation, such as adding an entry into a calendar. Also, the buttons 510, 512 can be labeled differently, such as replacing "jump" with "call" for the address book program. In this case, the user selects a phone number and selects call, thereby task switching to a telephone dialing program.

The jump button and return button are each a specific embodiment of aspects of the invention, and the invention is not restricted to these embodiments. Specifically, this document includes the description of (1) a jump function, exemplified by the jump button; and (2) a return function, exemplified by the return button. Specific embodiments of mechanism to invoke these functions include: (1) hardware button; (2) silk-screened button; (3) icon or text on a touch sensitive display screen; (4) implicit jump or return function, as described above; and (5) pull-down menus. Hereinafter, this document refers to any or all of these specific embodiments when the terms "jump function" and "return function" are used. The term "jump program" is defined here to be a program that is selected by a jump function; and the term "return program" is 20 defined to be a program that is called by a return function. The mechanisms by which jump functions and return functions achieve their desired results are described below.

Figure 7:
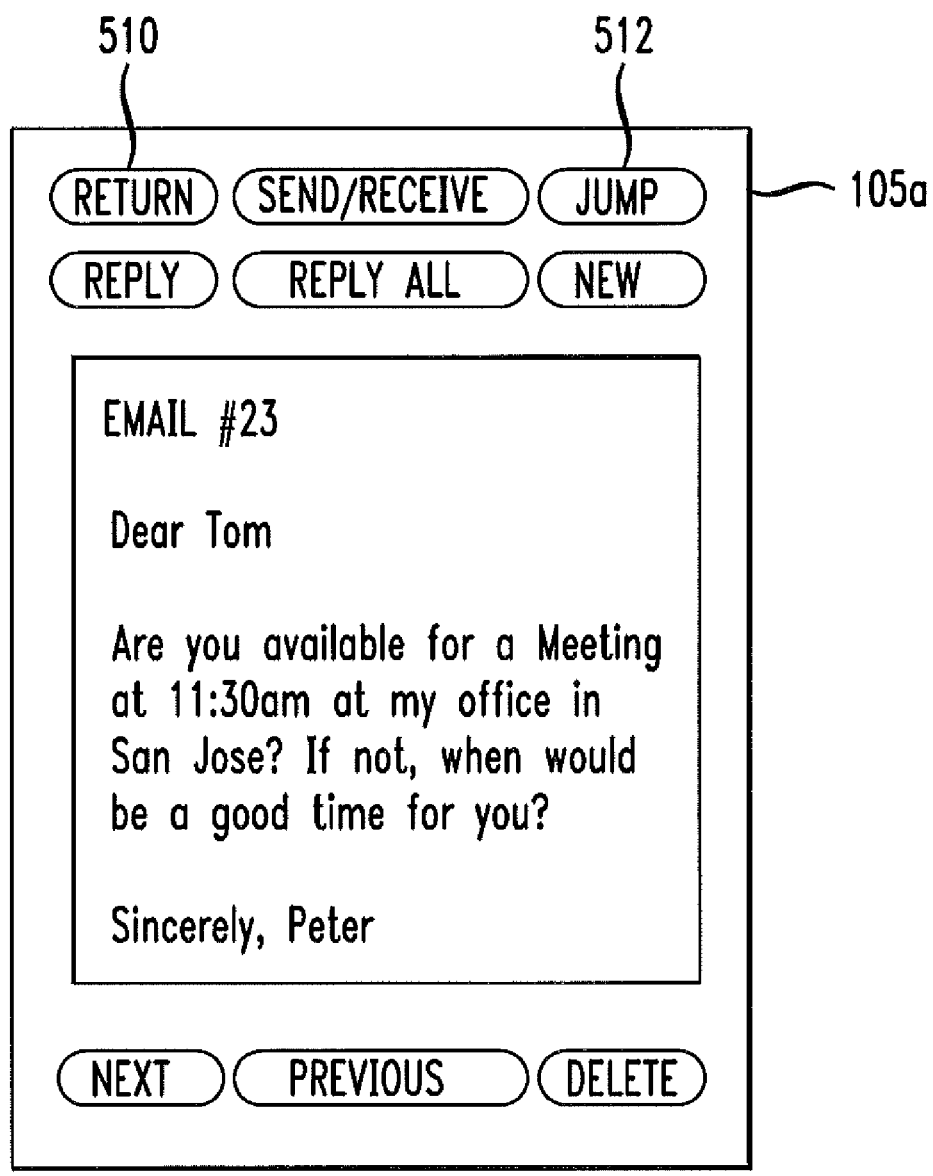
FIG. 7 is a display screen showing an exemplary email application, having a return button and a jump button in accordance with an embodiment of the present invention.
Figure 8:
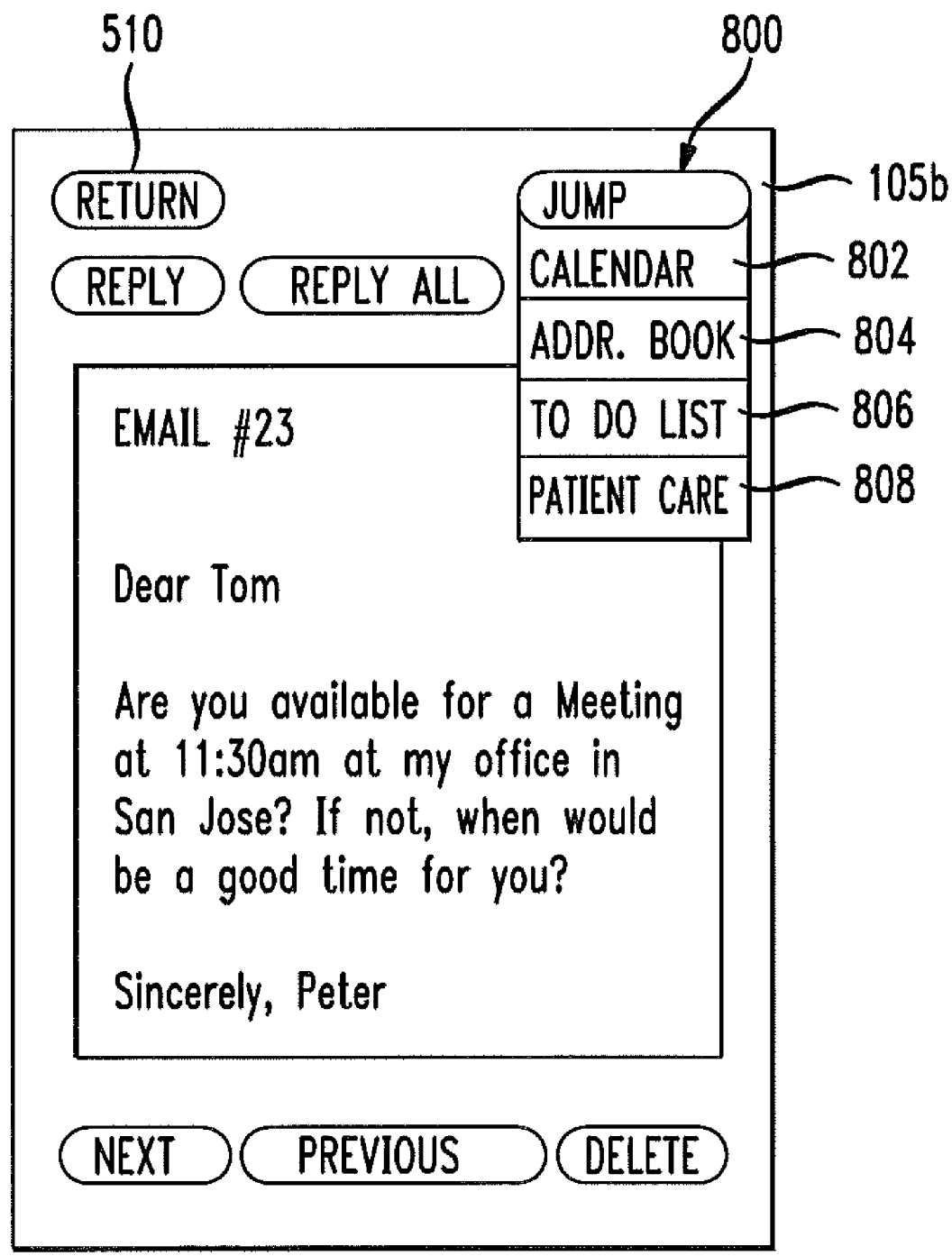
FIG. 8 is a display screen showing an exemplary email application, having a return button and a jump button, the jump button having been expanded to a pull-down menu, in accordance with an embodiment of the present invention.

FIG. 7 is a display screen 105a showing an exemplary email application, having a return button 510 and a jump button 512 in accordance with an embodiment of the present invention. Other buttons shown are typical of an email application. In this example, an email message, "EMAIL #23", has been received, requesting a meeting. If the user is done with the email program, he can select the return button 510, which invokes a return function, thereby taking him back to the previous program. However, the user may decide to reply to this email, but needs to consult his calendar. The user selects the jump button 512, and this causes a pull-down menu 800 to appear on display screen 150b, as shown in FIG. 8. In this example, possible jump programs are: (1) calendar 802; (2) address book 804; (3) to-do list 806; and (4) patient care 808. These four particular possible jump programs are shown because it is useful for the user to task switch to these programs from the email program. Jump program choices can be coded into a program and/or selected by the user. In this example, the first three would be typical jump programs 802, 804, 806 coded into an email program, but the last one 808 is a user-added choice to manage the care of patients, which is an application designed for physicians.

When the user selects a jump program, the current program stores its program state as a context packet, The context packet needs to contain enough information so that the program can return to the same state. In the example of the email program for FIG. 8, the context packet's program-specific data 750 can simply be the number 23, thereby providing the email program with enough information to return to viewing email #23. Other examples of context packet program-specific data 750 are: (a) a calendar program storing the date being viewed; (b) an address book storing the record number of the contact information being viewed; (c) a to-do list storing the number of the task being viewed; (d) a chess program storing the position of the pieces and an indicator of whose move it is; (e) a web browser storing the URL of the web page being viewed, and possibly the URLs that can be viewed by use of the back or forward buttons; and (f) a pinball game program storing the score, location and velocity of the ball, the number of players, the current player, and the number of the ball. It should be the objective of every program to store the minimum amount of information into the context packet's program-specific data 750 so as to minimize the amount of memory used.

Figure 9:
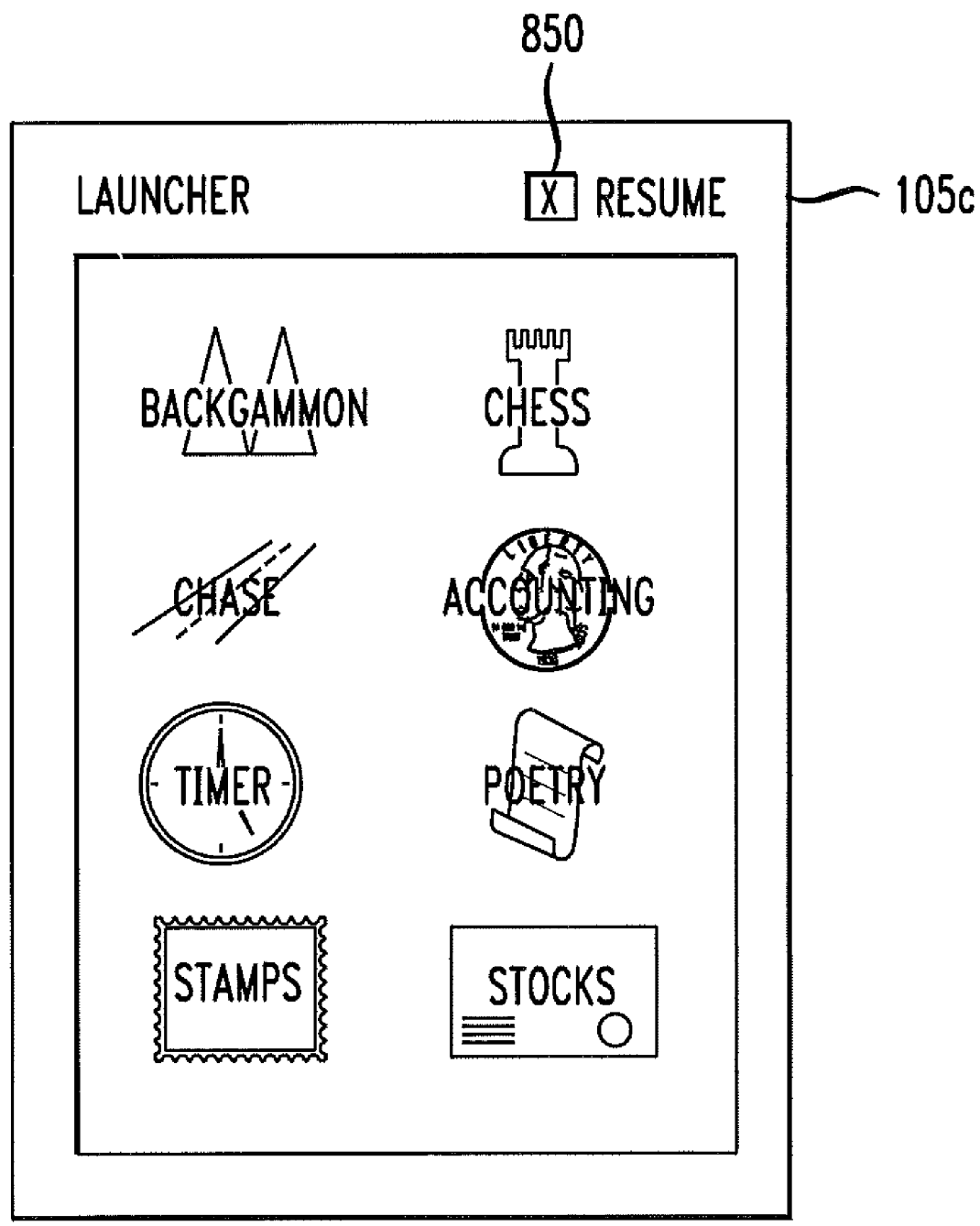
FIG. 9 is a display screen showing an exemplary program launcher, having a resume checkbox, in accordance with an embodiment of the present invention.

One program used on electronic devices is the launcher 617a, which is used to select other programs to run. The launcher 617a is generally part of the operating system of the electronic device. FIG. 9 is a display screen 105c showing an exemplary launcher, having a resume checkbox 850, in accordance with an embodiment of the present invention. When the user is launching a program from the launcher, he may not want to return to the state that program was in when it was last terminated. Hence, the resume checkbox 850 allows the user to specify whether the program state stored in a context packet is to be used, or not used, when the selected program is started. Alternatively, the resume checkbox 850 can be replaced with a return button, possibly with a pull-down menu; the pull-down menu displaying identifiers as indicated by the visual identifier 740.

Figure 10:
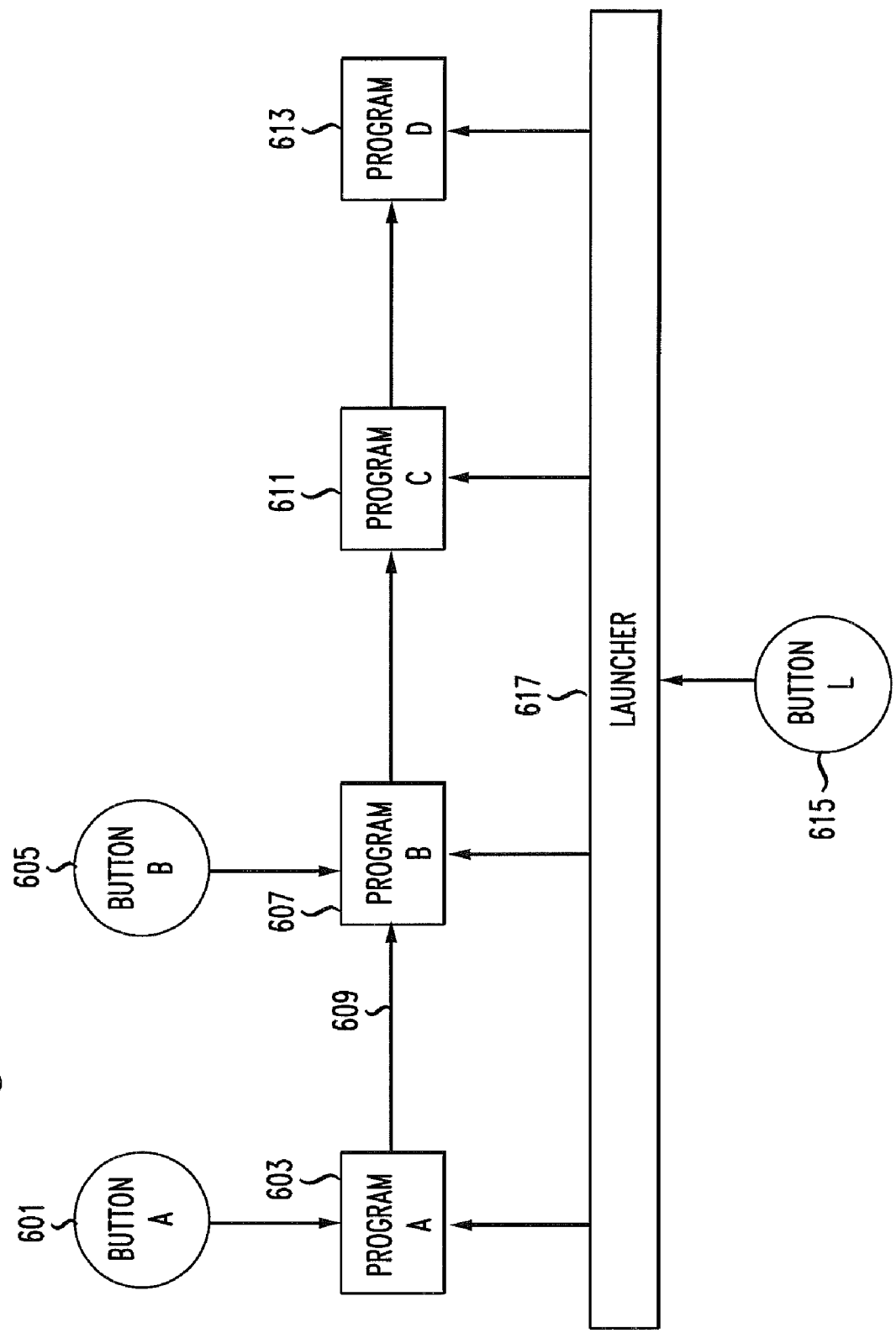
FIG. 10 is a task switching diagram showing five computer programs and three buttons.

Significant aspects of the prior art is exemplified in FIG. 10, which shows an exemplary task switching diagram with five computer programs and three buttons, the diagram illustrating the way task switching is currently handled by various existing electronic devices. In this example, if the user selects button A 601, program A 603 is invoked and begins running; and similarly for button B 605 and program B 607. If the user is running program A 603, he can cause a task switch to program B 607, as shown by the arrow 609 in the figure. Such programs currently have the capability of passing data from program A 603 to program B, where such passed data is input data to program B 607. Continuing with the example, the user can task switch from program B 607 to program C 611, and then from program C 611, task switch to program D 613. However, while running program D 613, should the user wish to return any of the previous programs 603, 607, 611, he must use either buttons 601,605 or the launcher 617 to start running those programs 603, 607, 611. The user can select button B 605, thereby again running program B 607, but this does not return the user to the place where he left off when he was last using program B 607 (unless program B 607 was suspended, as described above, but this uses significantly more memory). The user can select button L 615, invoking the launcher 617. The launcher 617 is a program, sometimes incorporated into the operating system, that provides the user with a list of all the programs installed on the electronic device, the user selecting a program from the list in order to cause it to start running. The list can include icons representing programs in the list. In this example, the launcher 617 displays a list of the available programs 603, 607, 611, 613. Invoking the launcher 617 terminates or suspends the current program, but once again, the user can not return to the place where he was when he last used a particular program. The return function (with accompanying return button 512) is not available in current electronic devices or current programs running on current electronic devices.

Figure 11:
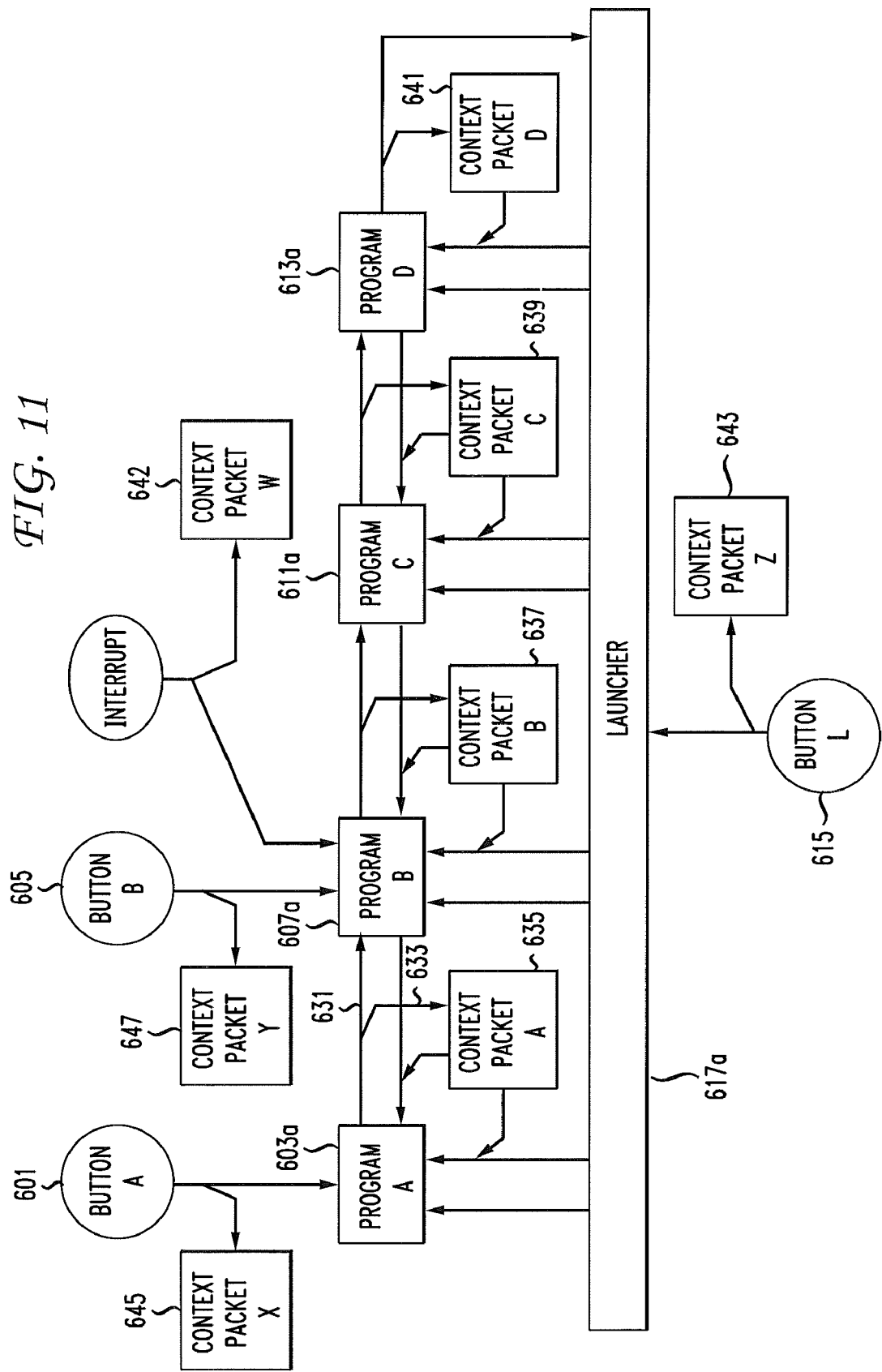
FIG. 11 is a task switching diagram in accordance with an embodiment of the present invention, showing five computer programs, three buttons, an interrupt event, and eight context packets.

The shortcomings of the example in FIG. 10 are overcome in the present invention by using the innovative context packet 520. FIG. 11 shows an exemplary task switching diagram in accordance with an embodiment of the present invention, showing five computer programs, three buttons, an interrupt event, and eight context packets. In this example, if the user selects button A 601, program A 603a is invoked and begins running; and button B 605 invokes program B 607a. Programs A 603a and B 607a are different from the corresponding programs in FIG. 10 in that they have been modified to utilize context packets, in accordance with the present invention. If the user is running program A 603a, he can cause a task switch to program B 607a, and the figure illustrates this with diverging arrows 631, 633, one arrow 631 illustrating the task switch to program B 607a, and the other arrow 633 illustrating the creation of context packet A 635 and its storage into memory. As in accordance with the present invention, program A 603a does the following: (1) creates a context packet storing information needed to recreate its state; and (2) stops running and relinquishes any memory it has been temporarily using. While running program A 603a, the user initiates the task switch through the use of a jump function. Continuing with the example, the user can task switch from program B 607a to program C 611a, and then from program C 611a, task switch to program D 613a. At each task swap, a corresponding context packet 637, 639 is created and stored into memory. When running program D 613a, the user can return to program C 611a at the place where he left off. To do this, the user utilizes a return function, which causes: (1) program D 613a to terminate; and (2) program C 611a to be started with context packet C 639 as input. Upon recognizing context packet C 639 as an input, program C uses the information stored in the context packet 639 to recreate the state that existed in the program 611a when the user's task swap invoked program D 613a. The context packets 635, 637, 639, 641 contain enough information for the corresponding program to 15 restore its state when it was last running. Each context packet contains information that is pertinent to the program that created it.

Whenever a program terminates due to a jump function, it creates a context packet, which can be used at any point in the future to recreate the state of the program. Looking again the example of FIG. 11, the user's selection of button L invokes the launcher 617a, but also causes the creation of context packet Z 643. When the button 615 is selected, a signal is sent to the currently running program, and it creates a context packet and terminates itself, before passing control to the launcher. By this mechanism, any button that invokes a program can invoke a jump function. In the example of FIG. 11, if program C 611a is running when button L 615 is selected, then context packet Z 643 is equivalent to context packet C 639 because it is created by program C 611a. Similarly, if program D 613a is running and button L 615 is selected, then context packet Z 643 is equivalent to context packet D 641. Hence, in FIG. 11, context packets X 645, Y 647, and Z 643 are each an alias for one of the context packets A through D 635, 637, 639, 641, depending on which program was running when the button 601, 605, 615 was selected. In a fashion similar to buttons, interrupts can also invoke a jump function, causing the creation of a context packet 642. Examples of interrupts include: timer countdown; alarm function; bus 54 hardware interrupt; receipt of email; docking station insertion; and other hardware interrupts.

Figure 12A:
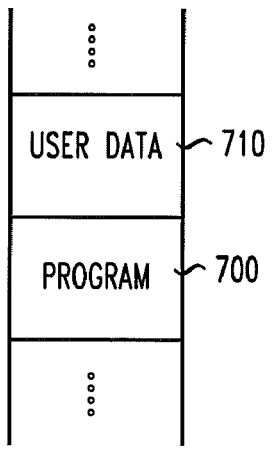
FIG. 12A is a representation of an electronic device's memory, showing a program in the non-running state.
Figure 12B:
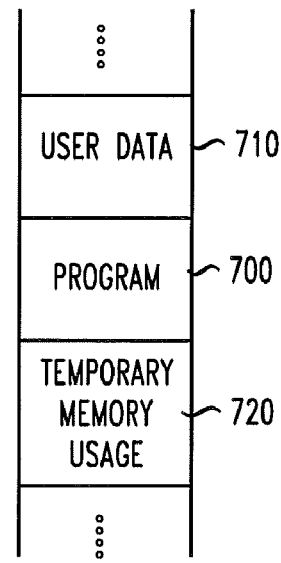
FIG. 12B is a representation of an electronic device's memory, showing a program in the running state.
Figure 12C:
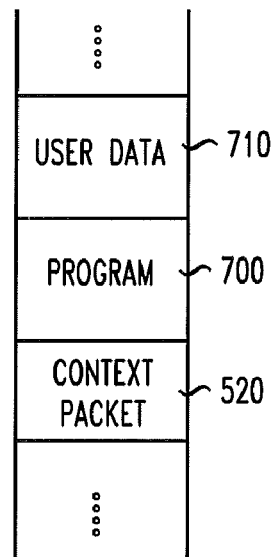
FIG. 12C is a representation of an electronic device's memory, showing a program in the non-running state with its state preserved in a context packet in accordance with an embodiment of the present invention.

FIGS. 12A through 12F show various items that are stored in the electronic device's memory. A program 700 is the object code that executes at least part of an application, and primarily remains unchanged once it is loaded into the memory. User data 710 is the information that is kept by a corresponding program 700 over time. For example, user data could be (a) a database of names, addresses, and phone numbers, as would be used for an address book program; (b) a set of received and sent email messages, as would be used by an email program; (c) a set of pictures, as would be used for a photo album program; and (d) a list of tasks, as would be used by a to-do list program. User data 710, as associated with a particular program 700, can vary in the amount of memory needed, but, generally, should not be deleted from memory without receiving a command from the user. When a program 700 is completely dormant (not running, not suspended, and having no associated context packet) the memory allocated to the program is shown in FIG. 12A. When the program 700 is running, as shown in FIG. 12B, the program uses additional temporary memory 720. Temporary memory usage could, for example, include decompressed information or pictures that are stored in compressed form as part of user data 710. Temporary memory usage 720 varies depending on the type of program 700, how the program 700 is written, and what the program 700 is doing. FIG. 12C shows memory when a program 700 has terminated, but has created and stored a context packet 520 in order to recreate its state. In general, a context packet 520 takes less memory than temporary memory usage 720, which means the use of context packets 520 saves memory.

Figure 12D:
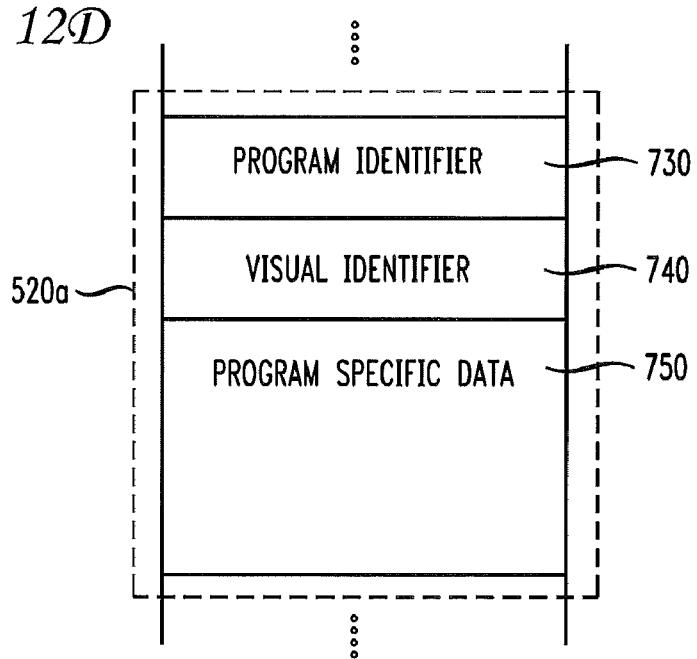
FIG. 12D is a representation of an electronic device's memory, showing a context packet in accordance with an embodiment of the present invention.

FIG. 12D shows an embodiment of a context packet 520a comprising: (1) a program identifier 730, which is a unique identifier for each program resident in an electronic device, generally implemented as a 32-bit number; (2) a visual identifier 740, which stores a text string, an icon, and/or other visual information, the visual identifier being displayed on the display 105 of the electronic device so the user can select the corresponding program 710; and (3) program-specific data 750, which is the information necessary for a program to recreate its state when it starts running. The visual information is used, for example, when the jump button pull-down menu is made visible.

Figure 12E:
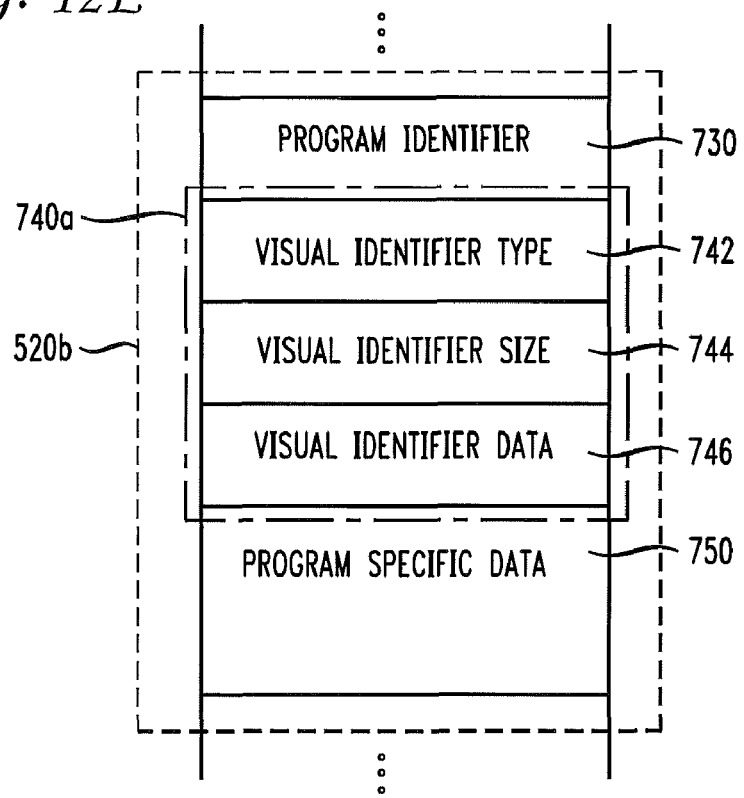
FIG. 12E is a representation of an electronic device's memory, showing a context packet in accordance with an embodiment of the present invention.

FIG. 12E shows another embodiment of a context packet 520b, where the visual identifier is shown as comprising: (1) a visual identifier type 742, used to indicate how visual identifier data 746 should be displayed, display types including, for example, monochrome icon, animated monochrome icon, 8-bit color icon, 8-bit color animated color icon, and text string; (2) visual identifier size 744, used to indicate the size of the icon and/or the amount of memory used for the visual identifier data 746; and (3) the visual identifier data 746, which is the data to be displayed on the display 105.

Figure 12F:
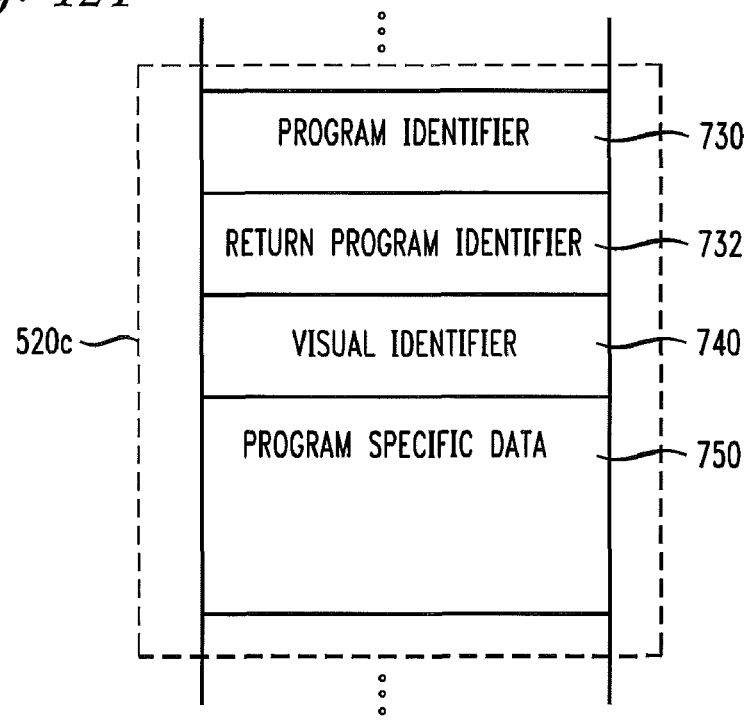
FIG. 12F is a representation of an electronic device's memory, showing a context packet in accordance with an embodiment of the present invention.

FIG. 12F shows a context packet 520c further comprising a return program identifier 732. The return program identifier is either: a numerical identification number uniquely associated with a program installed on the electronic device; or a pointer to a memory location where a context packet 520c is located, the context packet 520c including a program identifier 730.

In each of FIGS. 12A through 12F, memory usage by a program is shown as contiguous and in a specific order, but this is just for ease of illustration. Memory allocation is generally done in small chunks, or pages. Memory allocated to any particular program 700, user data 710, temporary memory usage 720, or context packet 520 can be distributed throughout the memory, and need not be contiguous or in a specific order.

The preferred use of context packets allocates one context packet per program loaded into the electronic device. That is, each program has one saved state to which it can be returned. However, alternate embodiments can include multiple context packets per installed program. For example, users might desire two context packets for certain programs, thereby allowing a program to perform a return function to itself, or to remember two different program states because a jump function was performed by two different programs to the same program.

Context packets are generated by a program in response to a jump function, and used by a return function as an input to the program to recreate the program's previous state. The associating of a particular return function to a particular context packet can be done in a variety of ways. The first mechanism for associating programs with context packets is for the operating system to keep track of the list of all context packets. Then, when a return function is going to invoke the running of a program, the list of context packets is searched for a matching context packet; the search being done for a matching program identifier 730. In this case, the running program must pass at least its program identifier to the jump program so that the jump program knows which context packet to use for the return function. The program identifier can be stored in: (1) the program 700; (2) user data 710; (3) the context packet 520 created by the jump program when the user invokes the next jump function; or (4) a separate portion of memory managed by the operating system. Choices (3) and (4) are preferable since the program identifier is not generally considered part of either the program 710 or the user data 710.

A second mechanism for associating programs with context packets is accomplished by having a running program pass its context packet (not just the program identifier) to the jump program, and the jump program storing the context packet in memory that is not relinquished when the jump program stops running. This non-relinquished memory can be part of: (1) the program 710, (2) user data 710; (3) the context packet 520 created by the jump program when the user invokes the next jump function; or (4) a separate portion of memory manages by the operating system. Choice (4) is preferable since context packets are not generally considered part of either the program 710 or the user data 710, and storing a context packet within a context packet is unnecessarily complex.

A third mechanism for associating programs with context packets provides far fully recursive context packet usage, thereby allowing an entire chain of jump functions to be traversed by return functions, even if the same program appears in the chain of jump functions more than once. In an embodiment for this recursive approach, each context packet can include a pointer to the previous context packet. In other words, if a user invokes a jump function to task swap from program x to program y, and then uses another jump function to task swap from program y to program z, then the context packet for program y (the one that preserves the state of program y) includes a pointer to the context packet for program x. This makes logical sense because the program to which program y returns is considered part of the state of program y. To keep the total number of context packets bounded, a maximum number of total context packets could be specified by the user, or programmed into the electronic device as a fixed constant. Also, invoking a return function destroys the corresponding context packet, which releases the memory used by that context packet. Alternatively, context packets can store the context packet of the return program.

One alternate embodiment of the present invention includes a context packet control panel, providing a mechanism for a user to set parameters that affect context packets and to manage context packet memory usage. The context packet control panel can be used for any of the following: (1) selecting the maximum number of context packets on a per-program basis; (2) deleting context packets; (3) setting a time period for which a context packet is kept since its creation, after the time period is over, the context packet is deleted, the time period for keeping context packets applied to either all context packets or applied on a per-program basis; (4) selecting the total number of context packets, such that if this total is exceeded, the oldest context packets are deleted; (5) selecting the maximum amount of memory used to store context packets, such that if this total is exceeded, the oldest context packets are deleted; and (6) selecting which installed programs are to be included as possible jump programs on a per-program basis. The operations of the context packet control panel can be incorporated into any other control panel or program that sets parameters for the electronic device.

FIG. 13 is a flow diagram of a computer process in accordance with an embodiment of the present invention for the use of a context packet by a program. FIG. 13 encompasses the point from when a program 900 starts running 901 to the point when it is terminated 903. Upon starting 901, the program 900 determines 905 whether it was called from a return function of a different program, and this can be done by detecting the presence of a context packet as an input. If there is a context packet as an input, the program 900 is started 907 using the context packet to set the state of the program. Otherwise, the program is started 909 without a context packet, thereby starting in its default state. The program 900 then performs its normal functions 911, including things such as receiving user input, updating stored user data, and communicating with external devices. As the program functions 911 are done, the program 900 monitors for when the user selects a return function 915 or a jump function 913. If a return function has been selected 915, a return function 917 is executed. The return function 917 comprises the steps: (1) locating 921 the return program context packet corresponding to the return program that is to be the next program to be run; (2) storing 923 the program state of the currently running program 900 into a context packet and saving it to memory (this step is optional as a user would not generally want to return to a jump program at that point); (3) releasing 925 temporary memory that is used by the program 900, so as to allow other programs to use the memory; and (4) calling 927 the return program with its context packet as input, thereby making the return program the next running program. If a jump function has been selected 913, a jump function 929 is executed. The jump function 929 comprises the steps: (1) determining 931 the jump program that is to be the next program to be run, possibly from a plurality of possible choices; (2) creating 933 input data for the jump program based on data in the current program; (3) storing 935 the program state of the currently running program 900 into a context packet and saving it to memory; (4) releasing 937 temporary memory that is used by the program 900, so as to allow other programs to use the memory; and (5) calling 939 the jump program with the created input data as input. Once either the return function 917 or the jump function 929 has been executed, the program 900 terminates.

The preferred embodiment of the present invention, task switching with state preservation for programs running on an electronic device, is thus described. While the present invention has been described in particular embodiments, it should be appreciated that the present invention should not be construed as limited by such embodiments, but rather construed according to the below claims.

What is claimed is:

1. A method of managing a memory device in an electronic device, the method comprising the steps of:
   storing a first program and a user data of the first program in the memory device during execution of the first program;
   determining a second program to be executed by the electronic device, wherein the determining step comprises the step of: generating a plurality of programs installed on the electronic device available to be executed wherein the plurality of programs are selected from the group of: programs designed to be generated based on the first program and programs previously designated by a user of the electronic device to be generated based on the first program;
   storing a program state of the first program into a first context packet in a response to a selection of the second program;
   saving the first context packet in the memory device;
   releasing temporary memory used for the first program so as to allow other programs to use the temporary memory after storing the program state of the first program into the first context packet;
   storing the second program and a user data of the determined second program in the memory device; and
   upon receiving a request to execute a third program, suspending or terminating the execution of the second program and executing the third program based on a second context packet wherein the request to execute the third program is a request to resume execution of the first program and executing the third program is executing the first program based on the second context packet and wherein the resuming execution of the first program step further comprises the steps of: searching a plurality of context packets related to the first program; and selecting the second context packet from the plurality of context packets related to the first program.

2. A method according to claim 1, wherein the generating step further comprising the step of: displaying on a user interface of the electronic device a list of the generated plurality of programs.

3. A method according to claim 2, wherein the list of generated plurality of programs is displayed as a task switching menu.

4. A method according to claim 1, wherein the determining step comprises the step of: receiving a selection of one of the plurality of programs from a user of the electronic device.

5. A method according to claim 1, wherein the receiving a request step comprises receiving the request from a user of the electronic device.

6. A method according to claim 1, further comprising the step of: passing parameters from the first program to the second program.

7. A method according to claim 1, wherein the first context packet is related to a previously stored context packet.

8. A method according to claim 1, wherein the first and second context packets comprise a program identifier, a visual identifier, and program specific-data.

9. A method according to claim 1, wherein the second context packet is the first context packet.

10. A method according to claim 1, wherein the suspending or terminating the execution of the second program comprising the steps of:
    storing a program state of the second program into a third context packet; saving the third context packet in the memory device; and
    releasing memory used for the second program and user data of the second program.

11. An electronic device comprising:
    means for storing a first program and a user data of a first program in the memory device during execution of the first program;
    means for determining a second program to be executed by the electronic device, wherein the determining means comprises means for generating a plurality of programs installed on the electronic device available to be executed wherein the plurality of programs are selected from the group of: programs designed to be generated based on the first program and programs previously designated by a user of the electronic device to be generated based on the first program;
    means for storing a program state of the first program into a first context packet in a response to a selection of the second program;
    means for saving the first context packet in the memory device;
    means for releasing temporary memory used for the first program so as to allow other programs to use the temporary memory after storing the program state of the first program into the first context packet;
    means for storing the second program and a user data of the determined second program in the memory device; and
    means for receiving a request to execute the first program; and
    means for suspending or terminating the execution of the second program and resuming execution of the first program based on a second context packet wherein the resuming execution of the first program step further comprises means for searching a plurality of context packets related to the first program; and means for selecting the second context packet from the plurality of context packets related to the first program.

12. An electronic device comprising:
    a processor;
    a display device;
    an input device;
    a memory device; and
    a bus connecting the processor, the display device, the input device and the memory device, wherein the memory device comprises instructions when executed by the processor cause the electronic device to implement the steps of:
    storing a first program and a user data of a first program in the memory device during execution of the first program;
    determining a second program to be executed by the electronic device, wherein the determining step comprises the step of: generating a plurality of programs installed on the electronic device available to be executed wherein the plurality of programs are selected from the group of: programs designed to be generated based on the first program and programs previously designated by a user of the electronic device to be generated based on the first program;

storing a program state of the first program into a first context packet in a response to a selection of the second program;

saving the first context packet in the memory device;

releasing temporary memory used for the first program so as to allow other programs to use the temporary memory after storing the program state of the first program into the first context packet;

storing the second program data and a user data of the determined second program in the memory device; and upon receiving a request to execute a third program, suspending or terminating the execution of the second program and executing the third program based on a second context packet wherein the request to execute the third program is a request to resume execution of the first program and executing the third program is executing the first program based on the second context packet and wherein the resuming execution of the first program step further comprises the steps of: searching a plurality of context packets related to the first program; and selecting the second context packet from the plurality of context packets related to the first program.

* * * * *